United States Patent [19]

Harvey

[11] Patent Number: 5,261,819

[45] Date of Patent: Nov. 16, 1993

[54] APPARATUS FOR SIMULATING AN EXOATMOSPHERIC STRUCTURE

[75] Inventor: Robert L. Harvey, Santa Fe, Tex.

[73] Assignee: The United States of America as represented by the Administrator of the National Aeronautics and Space Administration, Washington, D.C.

[21] Appl. No.: 18,844

[22] Filed: Feb. 17, 1993

[51] Int. Cl.$^5$ .............................................. G09B 9/08
[52] U.S. Cl. .................................................... 434/34
[58] Field of Search ..................... 434/30, 34, 29, 55, 434/57

[56] References Cited

U.S. PATENT DOCUMENTS

| | | | |
|---|---|---|---|
| 1,393,456 | 10/1921 | Ruggles | 434/55 X |
| 2,485,266 | 10/1949 | Edinburg | 434/55 X |
| 4,764,090 | 8/1988 | Danson | 416/17 |
| 5,110,294 | 5/1992 | Brand | 434/34 |
| 5,137,372 | 8/1992 | Diggins | 434/34 X |

Primary Examiner—John J. Wilson
Assistant Examiner—Jeffrey A. Smith
Attorney, Agent, or Firm—Hardie R. Barr; Guy M. Miller; Edward K. Fein

[57] ABSTRACT

Apparatus for simulating an exoatmospheric structure, such as a spin stabilized satellite, in an environment subject to gravitational forces. The apparatus includes a floating structure which is pivotally and rotationally supported upon a gimballed bearing structure positioned adjacent the center of mass of the floating structure and suspended upon a support structure. The floating structure is translatable in either vertical direction relative to the supporting structure upon a vertically movable suspension system connected to the supporting structure. The supporting structure is provided with bearing assemblies which are adapted to engage a supporting surface for permitting freedom of movement of the supporting structure over the supporting structure in any direction.

16 Claims, 5 Drawing Sheets

APPARATUS FOR SIMULATING AN EXOATMOSPHERIC STRUCTURE

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND OF THE INVENTION

This invention relates to training and simulator devices and, more particularly, to an apparatus for simulating the configuration and motion of a structure in exoatmospheric space, such as a spin stabilized satellite, in an environment subject to gravitational forces.

Throughout the planning and implementation of successive missions in exoatmospheric space, it has been sought to develop systems for training astronauts and other workers whereby the vehicles to be operated or manipulated during a space mission may be realistically simulated in a laboratory or training facility. Thus, it has been sought to replicate the apparatus to be operated or manipulated by the astronauts and also to realistically simulate the operation and motions of such gravity free apparatus in an environment subject to gravitational forces. As orbital missions have continued over the years, increasing numbers of satellites have remained in orbit. Over time, some of these orbiting satellites have deviated from acceptable orbital parameters, and various systems in some satellites have on occasion malfunctioned. Thus, it has become necessary for astronauts to make repairs or adjustments of such malfunctioning satellites. In some instances, it has been necessary to maneuver a space vehicle toward such an errant satellite and capture the satellite for bringing it into the cargo bay of the rescue craft for repairs, for repositioning of the satellite, or for returning it to earth.

The capture of such orbiting satellites is complicated by a number of technical difficulties. First, the rescue craft must maneuver into an orbit corresponding with that of the errant satellite and approach the satellite. After reaching the satellite, the astronauts normally must exit the rescue craft and approach the satellite, using extravehicular maneuvering systems while wearing pressurized suits which tend to restrict movement and manual dexterity. Since such satellites may be spin stabilized, the errant satellite may be spinning about its major axis or possibly about another axis. It is thus necessary for the astronauts to stop the rotational movement of the satellite prior to repairs or bringing it into the bay of the rescue craft. However since the mass of the satellite is substantially greater than that of the astronauts and their gear, e.g., as much as 16,000 pounds, and since there is normally no convenient structure against which the astronaut may brace himself or herself during such an extravehicular mission, the capture and stabilization of such errant satellites has entailed a number of difficulties.

Accordingly, it has been sought to simulate such spinning, errant satellites in ground based laboratories or training facilities whereby astronauts may practice a rescue operation prior to the mission.

BACKGROUND OF THE PRIOR ART

Satellite simulating systems have thus been proposed wherein a replica of such an errant satellite is supported by mechanism which permits axial rotation of the satellite, rotation about its yaw and pitch axes, and translation along x and y axes, for simulating the characteristics of an errant satellite in a ground based, gravitational environment. It has been sought to devise such a system wherein the apparatus simulates the appearance, mass, center of gravity, and other physical characteristics of a spinning, errant satellite, and wherein an astronaut is thereby permitted to train for a rescue mission by "capturing" and maneuvering the simulation satellite. Typically, such training is accomplished by supporting the astronaut upon a zero-gravity simulation support apparatus, which permits translational and rotational movement of the astronaut which simulates that experienced in a gravity free environment. The satellite simulator or replica is thus supported upon a mechanism permitting translation and rotation of the simulated satellite about multiple axes, and caused to spin about its major axis to simulate the rotational movement of the errant satellite to be rescued. The astronaut-trainee, supported upon an articulated, gravity-free simulating support mechanism, is brought toward the spinning satellite simulator, whereupon he or she may practice "capturing" the satellite by engaging it and arresting its spinning movement, and then repairing it and/or translating it to a desired location.

Some such satellites have an end portion which includes a central portion which is recessed somewhat within an annular, peripheral, forwardly projecting cowling-like structure. In some instances, it has been attempted to capture such a satellite by means of a "capture bar," or other type of special tool, which is adapted to extend laterally across the recessed central portion, the capture bars having end portions having locking engagement mechanisms which, in operation, may be deployed and seated against surfaces formed within the cowling-like peripheral structure, whereby the capture bar is locked in place, extending laterally across the forward end of the satellite. Having thus locked the capture bar in place, the astronauts may then more readily arrest the rotational movement and maneuver the satellite, by manipulating the capture bar. In some embodiments, such capture bars include annular handles or gripping structures, having an axis coaxial with the major axis of the satellite after locking engagement, the gripping mechanism is then coaxial with the spin axis of the satellite. In operation, the satellites axial rotation may thus be incrementally slowed and stopped by the astronaut by gradually applying a resistive force through the annular gripping mechanism. In other missions, however, it may be desired to capture the satellite manually, without the use of such a capture bar.

As suggested above, for simulating the characteristics of such an errant satellite in a ground based facility, it has been sought to provide a rotational and translatable replica of the satellite which duplicates as closely as possibly the appearance and physical characteristics of the errant satellite. Such a simulator preferably would duplicate as closely as possible the configuration, mass, moments of inertia, and center of gravity of the errant satellite, and be freely rotatable about spin, yaw, and pitch axes, and translatable, in either direction, along x, y, and z axes, or combinations thereof.

Prior simulators have suffered from several limitations. Whereas they have been provided with supporting mechanisms which permit rotational and translational movement duplicating to a degree the characteristics of an orbital satellite, they have not provided realistic simulation of vertical translation of such satellites, i.e., translation parallel to the z axis. That is, astronauts in training have not been able to maneuver the simulated satellite freely in all directions as would be the case in a gravity-free environment. Additionally, each prior satellite simulator has been individually designed and constructed to correspond with a particular errant satellite, necessitating tedious and expensive, "custom" design and construction of each simulator in accordance with the physical characteristics of a respective satellite.

OBJECTS OF THE INVENTION

It is therefore, a major object of the present invention to provide an apparatus for realistically simulating an orbital, spinning satellite in a ground based facility.

Another object is to provide such an apparatus, which is operable to simulate an errant satellite, in which the simulated satellite is free to rotate about pitch, yaw, and roll axes and in which it is freely translatable along x, y, and z axes.

Yet another object is to provide such an apparatus in which inertial resistance to acceleration of the simulated satellite along or about any axis of movement, including linear accelerations of the simulated satellite along any axis of movement, realistically simulates that of an orbital, errant satellite.

A still further object is to provide such an apparatus in which the simulated satellite is supported by mechanism permitting vertical or "z-axis" displacements of the simulated satellite relative to the supporting mechanism and at the same time permitting translation of the satellite and the supporting mechanism in x and y directions relative to a supporting surface.

Yet another object of the invention is to provide such an apparatus in which the mass and pitch, roll, and yaw moments of inertia of the errant satellite are realistically simulated.

A still further object is to provide such an apparatus in which the simulated satellite includes a high fidelity structure, which replicates portions of a first errant satellite, the high fidelity structure being conveniently replaceable with another high fidelity structure which replicates another errant satellite, whereby only the high fidelity structure must be replaced when it is desired to simulate a second satellite having a configuration, mass, and moments of inertia which differ from those of the first satellite, whereby multiple satellite simulators need not be designed and constructed corresponding respectively to each orbital satellite to be simulated.

Other objects and advantages of the invention will become apparent from the specification and appended claims and from the accompanying drawing illustrative of the invention.

SUMMARY OF THE INVENTION

A satellite simulator is disclosed which is adapted to simulate a spinning, orbital satellite in a land based installation subject to gravitational forces. A floating, rotational and pivotal structure is provided having a roll inertia which is substantially equal to that of the satellite. In a preferred embodiment, the floating structure includes a high fidelity structure configured to replicate the configuration of a portion of the satellite which is of particular interest with respect to astronaut training. The mass and moments of inertia of the high fidelity structure do not necessarily correspond to those of the corresponding portions of the satellite. The high fidelity structure is removably mounted on one end of an elongated shaft member, the shaft also supporting a counterbalancing, inertial structure at a location spaced from the high fidelity structure, the shaft, the high fidelity structure, and the inertial structure forming a floating structure having a rotational inertia substantially equal to that of the satellite. A gimballed bearing assembly is connected to the shaft at a location spaced between the high fidelity structure and the inertial structure and congruent to the center of mass of the floating structure, the floating structure being axially rotatable within the bearing structure and pivotable about yaw and pitch axes. In one preferred embodiment, the gimballed bearing assembly is supported by a supporting structure which permits freedom of translational movement of the floating structure in either vertical direction, the assembly being further translatable in a substantially horizontal plane.

DETAILED DESCRIPTION OF PREFERRED EMBODIMENT

Figure 1:
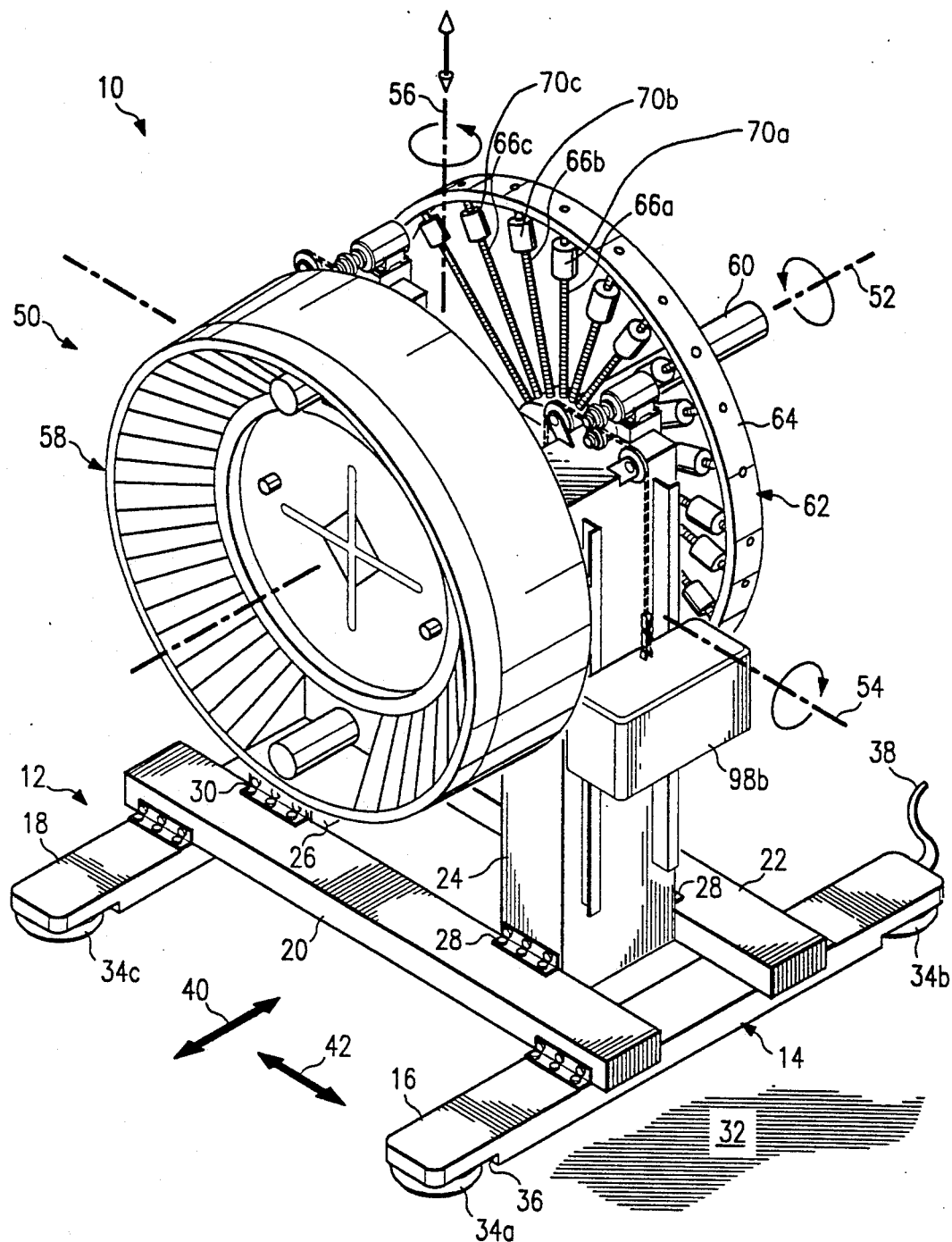
FIG. 1 is a perspective representation of one embodiment of the simulator.

With initial reference to FIG. 1, the present, illustrative embodiment of the simulator system 10 is adapted to simulate movement of an orbital satellite about six axes. The simulator 10 includes a support structure 12 having a base portion 14 which is suitably formed of first and second, mutually spaced, mutually parallel side structures 16 and 18 interconnected by first and second, laterally extending cross members 20, 22. First and second, vertical standards 24, 26 are rigidly supported by the cross members 20, 22, the vertical standards being suitably connected to the cross members 20, 22 by means of flanges 28, 30 bolted thereto and to the cross members. The vertical standards are preferably of rectangular cross-sectional configuration, and are suitably connected between the first and second cross members 20,22 and positioned centrally relative to the cross members, whereby they are spaced by equal distances from the respective adjacent end portions of the cross members, for providing stable support for maintaining the vertical standards in their vertical orientation.

The base structure 14 thus extends laterally in a generally planar region whereby it corresponds with a substantially horizontal floor surface 32 upon which it is supported, the floor surface preferably being of a rigid, smooth, non-fibrous material such as concrete. In other embodiments, not shown, an air bearing floor is employed. The base structure 14 is translatably supported upon the floor surface 32, preferably by means of air bearing assemblies 34a, 34b, 34c, and 34d (FIG. 2) which are mounted within respective distal end portions of the first and second side structures 16, 18. The air bearing assemblies are suitably commercially available units such as those available from the AIRFLOAT company as model number H-0014, and they are preferably pivotally supported beneath the side structures 16, 18 by means of downwardly extending swivel joints 36. The air bearings 34 a, b, c, and d are supplied with air under pressure by means of a manifold, not shown, extending within the base structure 14 and connected through flexible supply hose 38 to a source, not shown, of air suitably under approximately 13 psi of pressure. As will be more fully understood from the description hereinbelow of the operation of the simulator system 10, the air bearings 34 are adapted to support the simulator system above the floor surface 32 for permitting lateral or horizontal translational movement of the simulator over the supporting floor surface along x and y axes 40, 42 or in any combination thereof. Because of their pivotal, swivel mountings 36, their air cushion bearing "feet" are maintained in parallel alignment with the floor surface 32 for minimizing any resistance to horizontal movement of the support structure 12.

Figure 2:
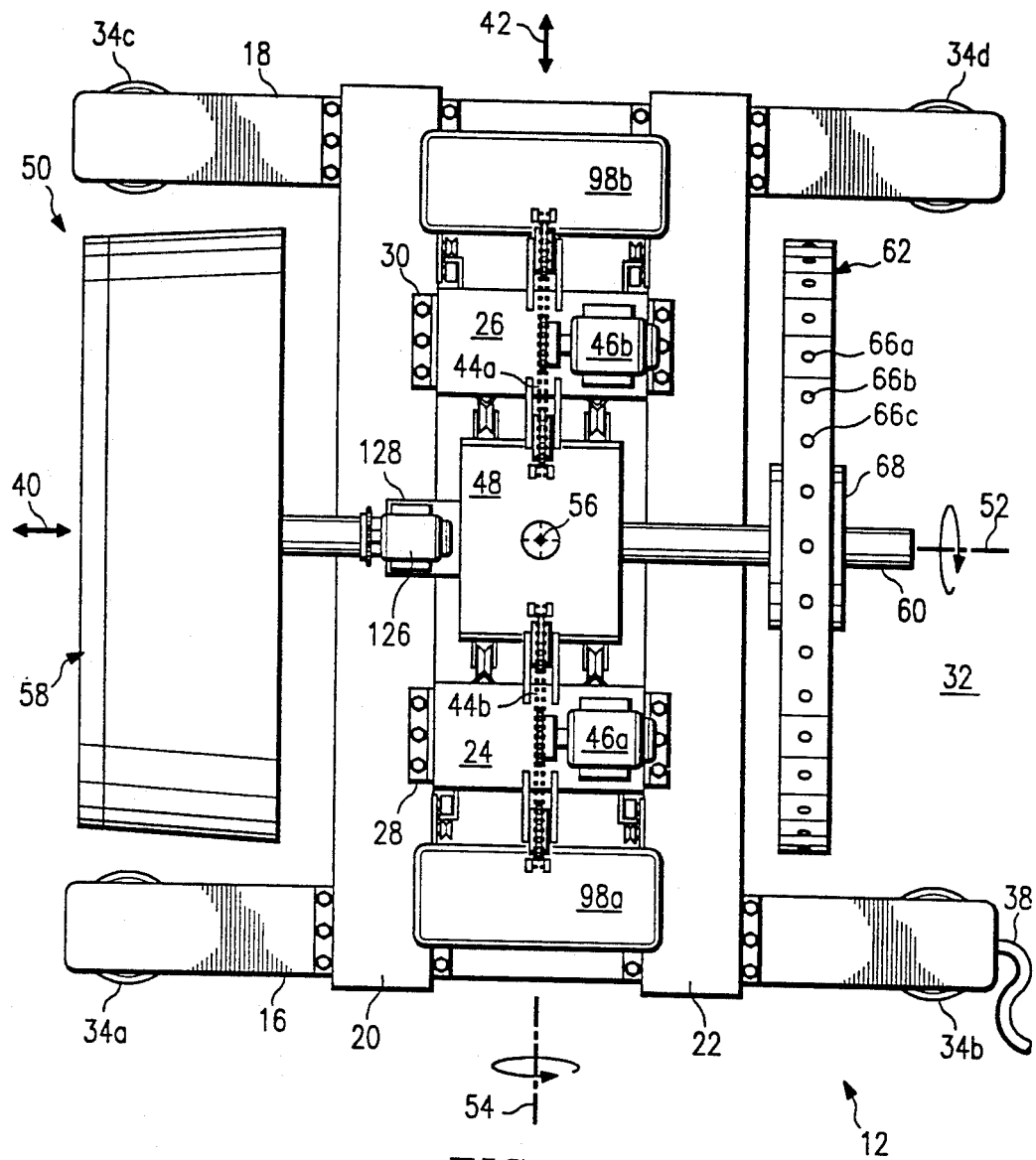
FIG. 2 is a top view of the embodiment of FIG. 1 showing the floating structure and the gimballed bearing structure.

As may be seen more clearly in FIGS. 2 and 3, and as will be described in greater detail hereinbelow, the vertical standards 24, 26 are connected, by means of cables 44a, 44b and vertical drive mechanisms 46a, 46b to a vertically translatable, gimbolled bearing structure 48. The floating structure 50 of the simulator, to be described, is rotationally and pivotally supported by the gimbolled bearing structure for rotation about spin axis 52 and for pivotal movement about pitch axis 54 and yaw axis 56 (FIGS. 1 and 2). The floating structure 50 includes a high fidelity structure 58, the forward end portion of which is adapted to replicate the configuration of an end portion of the orbital satellite which is to be simulated. The portion to be simulated is typically a forward end portion of upon which the astronauts will be working to capture or repair the satellite. The high fidelity structure 58 is removably mounted upon one end portion of an elongated shaft 60 which extends rearwardly from the high fidelity structure, through the gimbolled bearing structure 48. An annular, adjustable inertial structure 62 is coaxially mounted on the portion of the shaft 60 extending rearwardly from the gimbolled bearing structure 48. The floating structure 50 (comprising the high fidelity structure 58, the shaft 60, the inertial structure 62, and portions of the gimbolled bearing structure 48 which are rigidly affixed to the shaft 60), is, in the preferred, representative embodiment, substantially axially symmetrical about the spin axis and has a center of mass coincident with the gimbolled bearing structure 48, whereby the floating structure is balanced about the pitch axis 54 and substantially symmetrical about the spin axis 60. The floating structure is therefore balanced and pivotally rotatable upon gimbolled bearing structure 48 about the pitch and yaw axes 54 and 56, and it is axially rotatable within bearing structure 48 upon spin axis 60. Upon the air bearings 34 being supplied with air under pressure, the support structure 12 and the floating structure carried thereby is laterally translatable over the supporting structure 32 in any direction within the x-y plane 40, 42.

Figure 6:
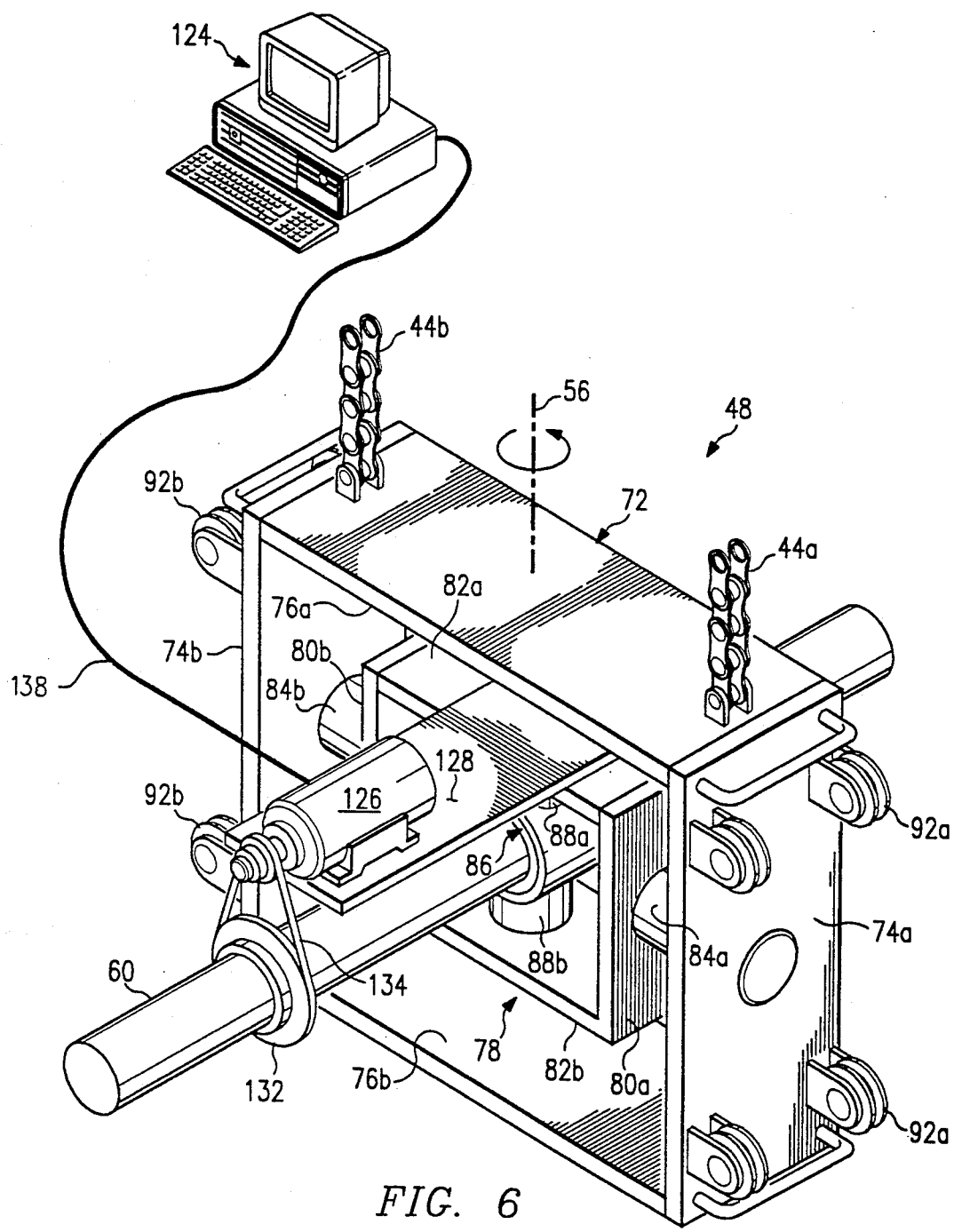
FIG. 6 is a perspective view, similar to FIG. 4, showing the gimballed bearing structure and the mechanism for rotating the floating structure about its spin axis.

The inertial structure 62, in the preferred embodiment, includes a peripheral ring member 64 through which are connected a plurality of threaded spoke members 66a, 66b, 66c . . . 66n which extend radially outwardly from a hub member 68 (FIG. 2) which is secured to the shaft 60, for supporting the ring member in coaxial alignment with the hub and the shaft. A plurality of adjustable weights 70a, 70b, 70c . . . 70n are threadingly and adjustably mounted on respective ones of the threaded spokes 66, the weights 70 being positionable at selected locations along the respective spokes for adjusting the roll inertia of the floating structure 50. The moments of pitch inertia of the floating structure may be adjusted by adjusting the position of the inertial structure 64 along the shaft 60. As will be described in greater detail hereinbelow, the inertial structure 62, and, optionally, other inertial structures which may be mounted forwardly of the bearing structure 48 on the shaft 60 or the high fidelity structure 58, may thus be adjusted for providing moments of inertia which balance that of the high fidelity structure and the shaft whereby the roll, pitch, and yaw moments of inertia of the floating structure 50 are closely equivalent to those of the orbital satellite. A spin drive mechanism, to be described and as shown most clearly in FIG. 6, is drivingly connected to shaft 60 and is adjustable for rotating the floating structure 50 about spin axis 60 at a desired rotational velocity approximating that at which the orbital satellite is spinning. Accordingly, an astronaut/trainee who is brought into proximity with the high fidelity structure 58, preferably supported upon an articulated maneuvering arm, not shown, adapted to simulate a gravity-free environment, may practice various procedures upon the floating structure 50 such as "capturing" it and stopping its spinning rotation by means of a capture bar which may be brought into engagement with the forward end portion of the high fidelity structure in a realistic manner. Thus, and as will be more fully discussed with respect to the inertia resulting from the additional mass inherent in the supporting structure 12, any forces exerted upon the satellite by the astronaut are opposed by inertial forces or by the momentum of the spinning floating structure, but not by any significant frictional forces, whereby the reaction of the simulator to applied forces closely approximates that of a spinning, orbital satellite.

As was previously suggested, in certain prior-art simulators, it has been sought to simulate the characteristics of errant orbital satellites by designing and constructing a simulator for each orbital satellite for which is was desired to train the astronauts. Thus, each simulator has been required to be individually designed and fabricated for replicating the configuration, mass, moments of inertia, and other characteristics of a respective satellite. In the present system, however, it is only necessary to replace the high fidelity structure with one having a forward configuration replicating that of the satellite of interest, and to readjust the mass, center of mass, and moments of inertia to those of the satellite of interest. Moreover, the high fidelity structure need not be designed and constructed in accordance with inertial characteristics of the simulated satellite, in that the moments of inertia of the floating structure 50 may be adjusted by various adjustments of the inertial structure, as will be described hereinbelow.

With additional reference to FIGS. 3-6, the construction of the counterbalanced z-axis drive mechanism and the gimbolled bearing structure will now be described. Referring to FIG. 3, the vertical standards are mutually spaced by a distance slightly greater than the width of the gimbolled bearing structure 48. As seen more clearly in FIG. 4, the gimballed bearing structure 48 suitably includes an outer frame 72, which may be of octagonal configuration, not shown, or of rectangular configuration as seen in FIG. 3. Referring to FIG. 4, the outer frame 72 has vertical members 74a, 74b interconnected at their upper and lower end portions by upper and lower members 76a, 76b. A similar, inner frame assembly 78 is nested within the outer frame assembly 72, and has first and second vertical frame members 80a, 80b interconnected by upper and lower members 82a and 82b. The inner frame assembly 78 is pivotally connected to the outer frame by horizontal pivot shaft members 84a, 84b, which are connected to the vertical members 80a, 80b at their respective midpoints and extend outwardly therefrom, their respective distal end portions being rotatably journalled within corresponding bearings within the adjacent vertical members 74a, 74b of outer frame assembly 72, for permitting pivotal movement of inner frame assembly 78 relative to the outer frame assembly 72 about pitch axis 52. A bearing assembly 86 is pivotally mounted within the inner frame 78 upon vertical shaft members 88a, 88b for permitting pivotal movement of bearing assembly 86 about the yaw axis 56. As seen in FIG. 2, the floating structure 50 is supported by the bearing assembly 86, shaft 60 being seated within the inner bearing ring by a suitable, releasable locking mechanism for permitting adjustment of the floating structure 50 within the bearing assembly whereby the center of mass of the floating structure 50 is centered within the bearing assembly 86 for pivotal movement about the pitch and yaw axes relative to the outer frame 72.

Figure 3:
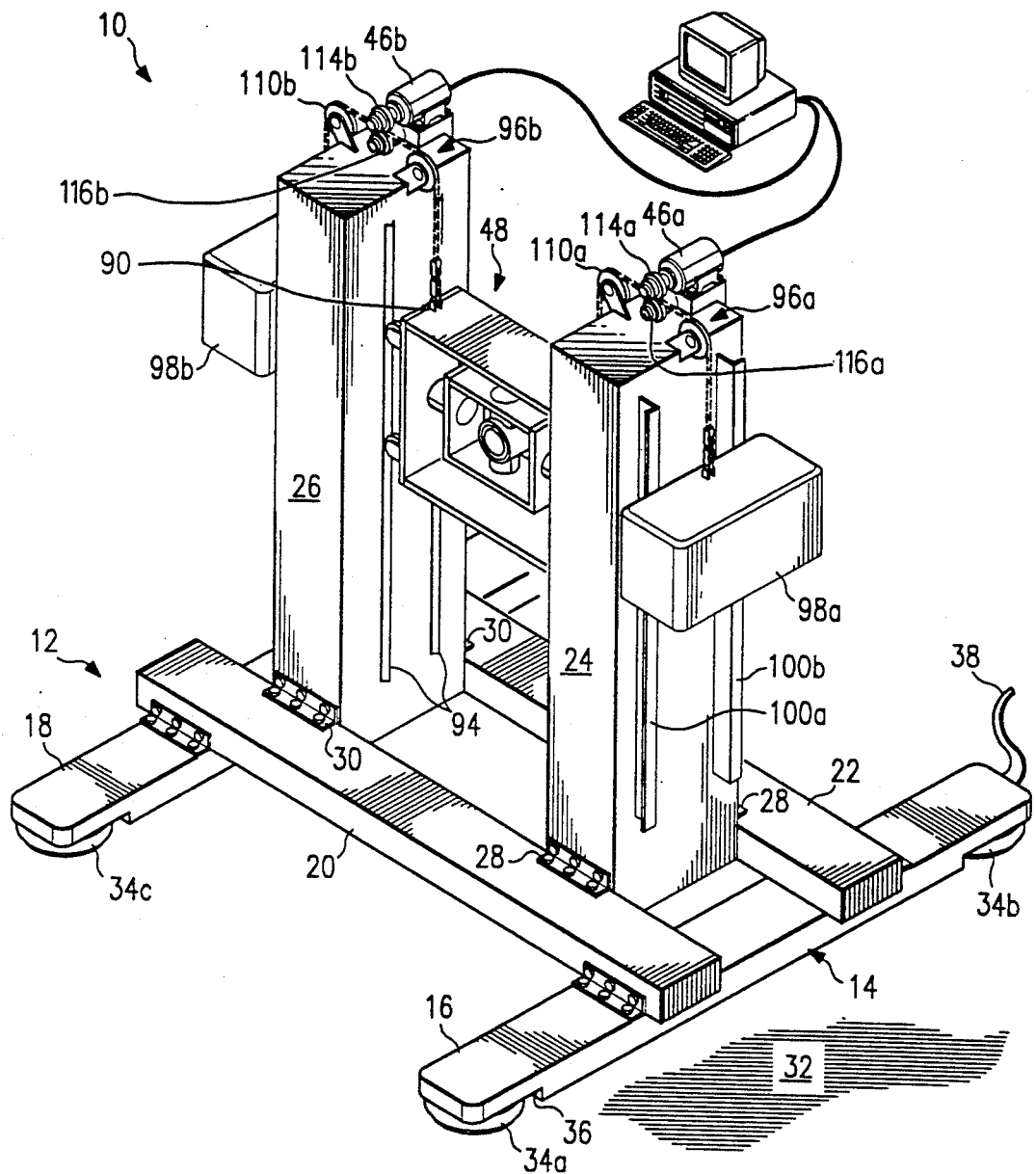
FIG. 3 is an enlarged perspective view showing the mechanism for translating the floating structure in a vertical direction.
Figure 4:
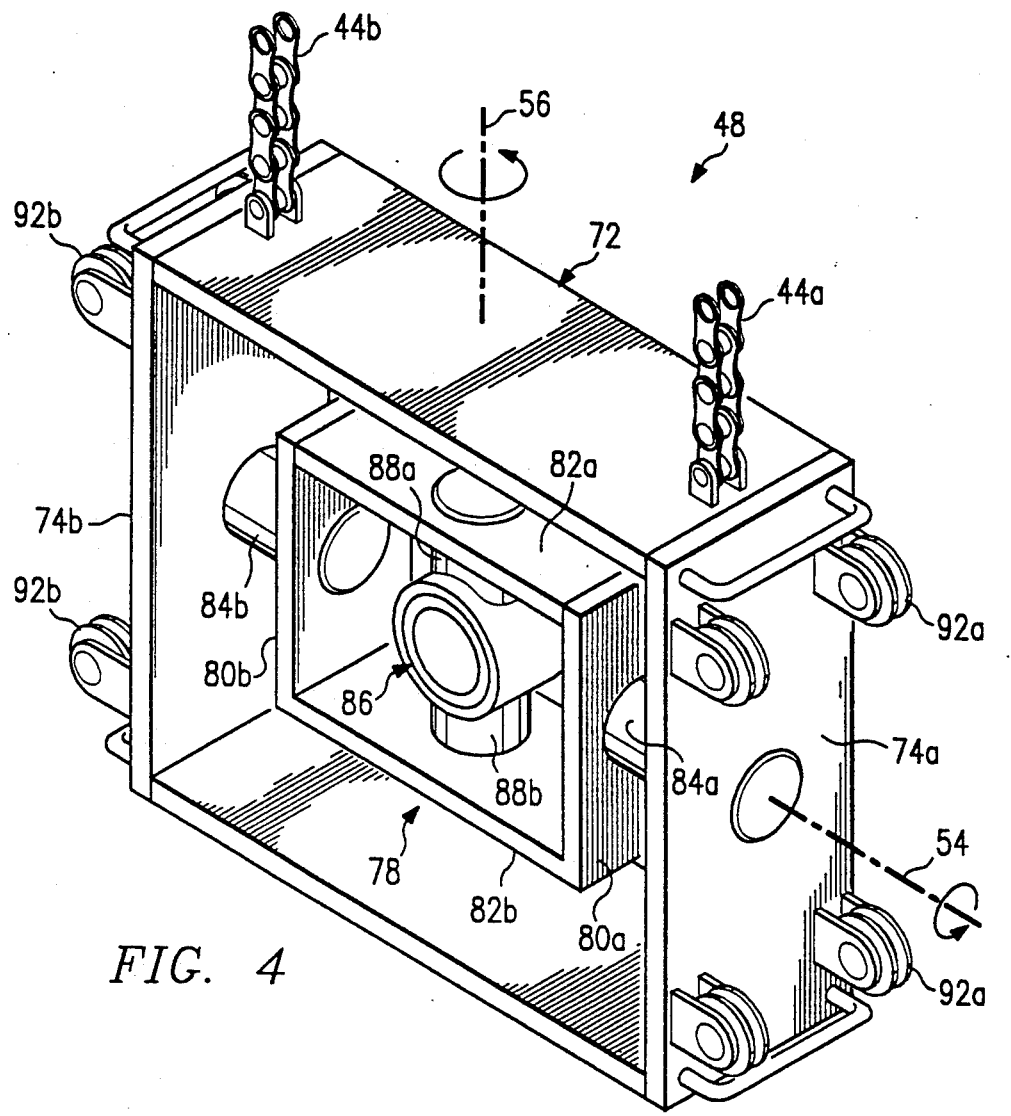
FIG. 4 is a perspective, partially diagrammatic representation of the gimballed bearing structure.
Figure 5:
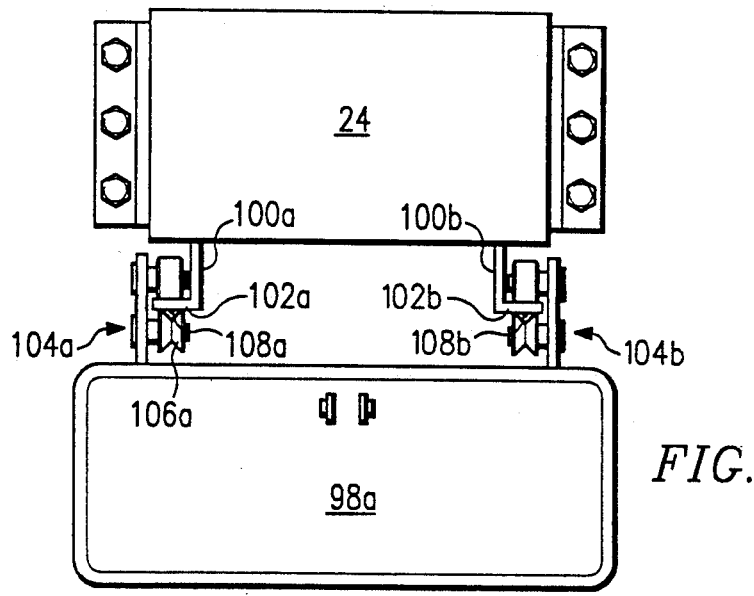
FIG. 5 is a top view in an enlarged scale showing details of the engagement between one of the counterbalance weight containers and the adjacent, vertical standard of the support structure.

As seen most clearly in FIG. 3, the gimballed bearing assembly 48 is suspended between the vertical standards 24, 26 by means of cables or chains 44a, 44b, connected to the outer frame assembly 72 by suitable fittings 90 affixed to opposite end portions of the upper frame member 76a, whereby the gimballed bearing assembly is supported by cables 44a, 44b between the vertical standards 28, 30. Vertically aligned sets of rollers 92a 92b, of concave, V-shaped outer configuration, are mounted on the first and second vertical frame members 74a, 74b for engaging vertical guide rails 94 (Fib. 3) mounted on the inner surfaces of the vertical standards, the vertical guide rails 94 being of V-shaped cross section corresponding to the V-rollers 92a, 92b, whereby the rollers engage and follow the vertical guide rails during vertical movement along standards 24, 26.

The chains 44a, 44b extend over the upper end portions of the vertical standards 24, 26, respectively, and are engaged with vertically oriented guide sprocket assemblies 96a, 96b, respectively, whereby the chains extend over the upper ends of the standards and downwardly along the respective outer sides of the standards for supporting respective counterweight containers 98a, 98b. Counterweight containers 98a, 98b are adapted to contain weights, not shown, sufficient in the aggregate to counterbalance the weight of the floating structure, suspended between the standards by the opposite end portions of the chains, whereby vertical movement of the floating structure is opposed only by frictional and inertial forces. Frictional resistance to vertical movement of the floating structure is opposed by servocontrolled drive mechanisms 46a and 46b, to be described hereinbelow. With added reference to FIG. 5, the vertical standard 24, as here typical of standard 24 and 26, is shown in greater detail with weight container 98a. First and second, L-shaped guide rails 100a, 100b are affixed to the outer side of the standard 24 and extend vertically along the standard in mutually spaced and parallel orientation. The L-shaped guide rails 100a, 100b have respective outwardly projecting flanges 102a, 102b which are engaged between first and second, vertically aligned guide rollers of first and second roller sets 104a, 104b mounted on the inner surface of weight container 98a. Roller sets 104a, 104b include V-rollers 106a, 106b, each of which is positioned to engage a V-configured strip 108a, 108b formed on the flanges 102a, 102b, respectively of guide rails 100a, 100b, whereby the roller sets 104a, 104b are locked in engagement with the guide rails 100a, 100b for restraining the weights and preventing pendulous movement of the weights adjacent the standards.

As seen more clearly in FIG. 3, the chains 44a, 44b extend between vertical drive pulleys 114a, 114b, respectively, and respectively adjacent follower pulleys 116a, 116b, drive pulleys 114a, 114b being coaxially mounted upon the respective distal end portions of drive shafts 118a, 118b extending from reduction gear assemblies 120a, 120b. Servocontrolled drive motors 122a, 122b are drivingly connected with gear assemblies 120a, 120b, respectively, for rotating the drive pulleys 114a, 114b to drive chains 44a, 44b across the upper end portions of vertical standards 24, 26, whereby vertical movement of the floating structure 50 and of the weight containers 98a, 98b, in an opposite direction, is effected. The servo-controlled drive motors 122a, 122b are actuated in response to vertical forces exerted upon the floating structure 50 by the astronauts, under the control of a processor 124. The processor is suitably an IBM-compatable personal computer, and the energization of drive motors 122a, 122b to supplement forces applied by the astronaut, to minimize frictional resistance to vertical movement of the floating structure 50, is accomplished by programming the computer to apply additional power to the drive motors sufficient to overcome or counter frictional torque of the chains and pulleys. Suitably, the servo-controlled drive motors 122a, 122b are commercially available units, such as system model ZX-610-240V-50 of The Parker Company.

Accordingly, vertical displacement of the floating structure 50 by the astronaut/trainees is effected by exerting upward or downward forces upon the structure and such vertical forces are opposed by the inertia of the floating structure and of the weights within the weight containers 98a, 98b, but not by any substantial frictional forces. Thus, the vertical acceleration of the floating structure in response to such vertical forces exerted by the astronauts simulates that of the orbital satellite, and the simulator system thus provides realistic simulation of movement in six axes.

With reference to FIG. 6, the shaft 60 is driven by means of a roll shaft drive mechanism including a servocontrolled drive motor 126, suitably system model ZX-610-240V-50 of The Parker Company. Roll motor 126 is supported upon a mounting plate 128 which is affixed to the top plate 88a (FIG. 4), whereby the motor 126 is caused to remain in alignment with the shaft 60 during yaw and pitch of the shaft within the gimballed bearing assembly 48. The roll motor is supported in parallel alignment with the shaft 60 and has a drive shaft supporting a chain drive pulley 130 aligned with a corresponding, larger, driven pulley 132 and engaging an endless chain 134 which extends around the drive pulley and the driven pulley 132, driven pulley 132 being coaxially mounted on the shaft 60, whereby the floating structure 50 is rotated in the roll axis during all possible orientations of the shaft 60 within the gimballed bearing structure 48. The motor 126 is powered through a suitable, flexible cable 138 connected to the central processor 124, or it may be connected to any suitable variable power supply, whereby the rotation of the floating structure upon the spin axis may be adjusted to correspond with that of the orbital satellite. The motor is thus caused to accelerate the floating structure to a predetermined rotational velocity, and subsequently to maintain that rotational velocity, which is equivalent to inputting a torque on the shaft which is equal to and opposite to the frictional resistance to such rotation.

The procedure for adjusting and balancing the apparatus 10 for simulating mass properties of the orbital satellite will now be described. It should be understood that the simulation of mass properties of a system in orbit in a gravitational environment entails a degree of adjustment based on empirical observations and processes along with an evaluation of the mass and moments of inertia of the floating structure 50 and of the supporting structures. Additionally, as a practical matter, such adjustments will entail compromises between absolutely accurate simulation of total mass, moments of inertia about various axes, resistance to vertical movement, and the like. For example, it may not be practicably possible to completely replicate the Ixx, Iyy, Izz, center of mass, and the total mass of the satellite simultaneously. It thus may be necessary to determine which of these properties are most important to simulate for a given training exercise, and to accept a compromise with respect to the other parameters.

The following procedures have been followed with favorable results and are recommended for typical training exercises. It should be emphasized at the outset that adjustments of the floating structure 50 and other portions of the simulator should be performed with extreme caution with respect to possible hazards to workers and nearby personnel, in that structures of substantial weight are to be suspended with no rigid support therefor. In the following procedures, certain assumptions are made for simplifying the calculations. First, the apparatus to be described has six degrees of freedom. It will be noted that in certain applications, the Z-axis vertical drive mechanism may not be required, in which case the floating structure may be supported within a gimballed bearing structure, not shown, which is affixed to a non-moveable portion of a vertical support structure rather than being suspended between the vertical standards by means of counterbalanced chain drive mechanisms as described above with reference to FIGS. 1-3. It is also assumed that any pivotal movement of the floating structure occurs within the gimbal structure, and that no such pivotal movement of the support structure 12 occurs. Mass properties of certain structures are ignored because they do not have significant effects and would unduly complicate the calculations. These include the mass of certain clamping and fastening apparatus employed for adding small amounts of mass to portions of the floating structure 50 for performing fine adjustments of balance. Further, the errant satellite is assumed to be of axially symmetrical mass properties, and the floating structure 50 is therefore of substantially symmetrical construction about its roll axis.

Five initial conditions must be met to achieve correct assembly of the simulator. (1) The roll shaft 60 must be adjusted so that it's pivot point, located in the center of the gimbal assembly, is coincident with the center of mass of the floating structure 50, which in turn corresponds with the center of mass of the satellite being simulated. The designer must therefore know the length of the shaft 60 projecting rearwardly from the high fidelity structure 58. With this understanding, the roll shaft 60 can be located in the gimbal assembly and locked into position with suitable locking clamps, not shown. This is accomplished in order to insure that the pitch and yaw motions of the floating structure occur around the same point as the orbital satellite. Once this adjustment is correctly made, it should not be changed.

(2) The floating structure must then be balanced upon this pivot point. The procedures for accomplishing this will be discussed further below, and are not to be effected by changing the setting obtained in step one. This is accomplished by calculation of the mass of the high fidelity structure, and by the corresponding positioning of the inertial structure 62. Any errors which may be made in calculations or in the positioning of the inertial structure will result in imbalance of the floating structure, and/or its not having the proper mass properties. If the floating structure is nearly balanced, but not exactly balanced after properly going through the above procedures, it should not be adjusted into a balanced condition by moving either the high fidelity structure, the roll shaft position within the gimbal assembly, or the location of the inertial structure. To adjust for small amounts of unbalance, mass balancing clamps or weights may be fastened on the roll shaft at locations necessary to obtain balance. This will have little effect on the inertias and mass of the floating structure, but should be incorporated into the various adjustment equations and procedures to be described below.

(3) The sum of the roll inertias of the high fidelity structure, the inertial structure, and the roll shaft and any balancing clamps thereon (i.e., the floating structure 50), must add up to the satellites roll inertia. No mathematical transformations are necessary in this calculation, in that all of these components rotate about the same axis, during roll.

(4) The sum of the pitch and yaw inertias (since they are assumed to be equal) for each of the high fidelity structure, roll shaft, any balancing clamps, and the inertial structure (i.e., the floating structure 50), taken around the pivot point in the center of the gimbal assembly, must equal the pitch and yaw inertias of the satellite. Before these additions are made, each of the respective inertias must be calculated and transformed to the stated pivot point by means of the parallel axis theorem, which is set forth by the equation $I = ICM + MH^2$, wherein parameter I is the transformed inertia, ICM is the inertia to be transformed, M is the mass associated with ICM, and $H^2$ is the square of the parallel distance between the original and the transformed rotational axes. Any errors which occur in this calculation will result in inaccuracies in the mass properties of the floating structure.

(5) The ttal mass of the simulator apparatus 10 must be adjusted to provide the best compromise of mass and inertial properties for the particular exercise. For example, assume that the mass of the inertial structure is one half of the total mass of the satellite. Weights added to the weight containers could then suitably provide an equal, balancing mass, which would provide accurate counter balance of the floating structure and provide accurate simulation of vertical translation of the floating structure. However, inertial effects of translations of the simulator in the horizontal, x-y plane would be somewhat inaccurate because of the additional mass inherent in the supporting structure, the total mass of the simulator being greater than that of the satellite.

"Condition Two:" The methods for adjusting the balance of the floating structure about its pivot point (first moments) will now be discussed. From the above conditions, the moments about the gimbal pivot point are calculate by the following relationship:

$$(MHF)(OS+D)+(MRS)(D-L/2)+(MIS)(-2)=0 \quad (1)$$

wherein MHF is the mass of the high fidelity structure; MRS is the mass of the roll shaft; and MIS is the mass of the inertial structure. $OS+D$, $D-L/2$, and $-d$ are the respective moment arms of these masses.

Rearranging equation (1), we obtain:

$$d=\{(MHF)(OS+D)+(MRS)(D-L/2)\}/(MIS) \quad (2)$$

Thus, two unknowns, d (the moment arm of the inertial structure) and MHF are related. All the other factors are generally known. Accordingly, the high fidelity structure is preferably designed with the proper roll inertia, pitch inertia, and mass. The inertial structure's position, d, is adjusted by setting d in accordance with the above equation (2), which should balance the floating structure. The designer can design the high fidelity structure in conjunction with a spreadsheet or solid modeling software which will keep track of the total mass and moments of inertia as the design proceeds. By this method, the designer can design the high fidelity structure so that when the design is completed, the mass, roll, and pitch inertias around it's center of gravity are the values which must be obtained according to the procedures discussed hereinbelow. In the event that the floating structure is nearly but not perfectly balanced by this procedure, mass balancing clamps may be attached thereto, as previously discussed. It should be noted that the torque of the roll shaft may be either positive or negative, depending upon the direction in which it must be shifted to set up the simulation of the center of gravity of the satellite, as in the first condition.

Next, the roll inertia of the high fidelity structure is determined. The roll inertia must be built into the high fidelity structure, as indicated above. When this inertia is added to the roll inertia of the shaft and that of the inertial system, the result must be the roll inertia of the satellite which is being simulated. By working backwards, one can calculate the roll inertia which must be designed into the high fidelity end to obtain this result. This may be accomplished using the roll inertia of the inertia structure which is calculated with the adjustable weights 70 in their center positions on the threaded spokes 66. After assembly, the adjustable weights are adjusted for accomplishing fine roll inertia adjustments only. Adjustment of the respective radial positions of the weights 70 upon threaded spokes 66 of the inertial structure 62 thus permits adjustment of the roll inertia of the floating structure.

From condition three, the roll inertias are summed as follows:

"Condition Three"

$$RIHIFI+RIS+RIIS=RISA, \quad (3)$$

wherein: RIHIFI, RIS, RIIS, AND RISA are, respectively, the roll inertia of the high fidelity structure, the shaft, the inertial structure, and the desired inertia of the satellite being simulated.

Rearranging equation (3):

$$RIHIFI=RISA-(RIS+RIIS) \quad (4)$$

In other words, to obtain the required roll inertia of the high fidelity structure around its center of gravity, one must subtract from the satellites roll inertia the sum of the roll inertias of the simulator roll shaft and the inertial structure. No parallel axis transformations are required since these inertias are around the same common axis.

"Condition Four": Determination of the pitch and yaw inertias of the high fidelity structure.

Condition four sets fourth the method of obtaining the required pitch and yaw inertias of the floating structure. Equation (2) above provides the distance, d, from the inertial structure to the gimbal pivot point. This distance, d, must be known in order to transform the inertia system pitch inertia (which is equal to the yaw inertia, to the pivot point of the floating structure, which is coincident with the center of gravity of the satellite.

The distance, $D+OS$ is the distance that the high fidelity structure pitch inertia must be transformed in order to add to the transformed pitch inertias of the inertial structure and the roll shaft. This procedure results in the total yaw and pitch inertias around the pivot point in the center of the gimbal. The roll inertia (and also the pitch and yaw inertias of the inertial structure are obtained by the designer by utilization of a spreadsheet or solid modeling program in a manner similar to their use in the design of the high fidelity structure. These are the required independent variables in formula (4) above.

Transforming the pitch inertias of the high fidelity structure, roll shaft, and inertial structure to the pivot point and summing them, one must obtain the pitch inertia of the satellite being simulated, as follows:

$$\{(PIHIFI)+MHF(OS+D)^2+ \\ (PIRS)+MRS(D-L/2)^2+(PIIS)+MIS(-d)^2\} \\ =PISA \quad (5)$$

wherein PIHIFI, PISA, PIRS, AND PIIS are the pitch inertias of the high fidelity structure around its center of gravity; the satellite around it's center of gravity, the roll shaft around its center of gravity, and the inertial structure around its center of gravity.

Solving equation (5) for the required pitch inertia of the high fidelity structure about it's center of gravity:

$$PIHIFI=PISA-(PIRS+PIIS)-(MHF)(OS+D)^2-(MRS)(D-L/2)^2-(MIS)(-d)^2 \quad (6)$$

Equation (6) gives the designer the exact pitch and yaw inertias which are required to be designed into the high fidelity structure so that the floating structure will have the proper pitch inertia.

Following the above procedure will assist the designer in balancing the floating structure and in providing appropriate pitch and yaw inertias for the floating structure. "Condition Five": Distribution of the simulator mass. The designer must at this stage determine, for the particular application, how to distribute the simulator mass to obtain the most advantageous simulation. A preferred method is as follows. If the implementation requires that vertical translations be more accurate than the two horizontal translations, the floating structure should be approximately half of the mass of the satellite, and the other half should be divided between the two counterbalance weight containers. This will result in accurate pitch and vertical translations, though yaw and horizontal translations will be in error. Conversely, if it is desirable to have the two horizontal translations more accurate than the vertical translations, the mass of the support structure and that of the floating structure should together equal that of the satellite.

It will now be understood that the present invention provides a simulator system which permits the realistic simulation of mass, inertial, visual, and configurational properties of a spinning orbital satellite in an environment subject to gravitational forces. Accordingly, as discussed above, an astronaut/trainee who is brought into proximity with the high fidelity structure 58 may practice various procedures upon the floating structure 50 such as "capturing" it and stopping its spinning rotation in a realistic manner. Moreover, forces exerted upon the satellite by the astronaut are opposed by inertial forces or by the momentum of the spinning floating structure, but not by any significant frictional forces, whereby the reaction of the simulator to applied forces closely approximates that of a spinning, orbital satellite.

Whereas in prior-art satellite simulators it has been necessary to simulate the characteristics of orbital satellites by designing and constructing a new simulator for each orbital satellite for which is was desired to train the astronauts, in the present system, it is only necessary to replace the high fidelity structure with one having appropriate mass characteristics and a forward configuration replicating that of the satellite of interest, and to adjust the balance and inertial characteristics.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. Apparatus for simulating an exoatmospheric structure of a predetermined configuration, having a first end portion, in an environment subject to gravitational forces, the apparatus comprising:
    a high fidelity structure having an end portion having a configuration which substantially replicates that of the first end portion of the exoatmospheric structure;
    an elongated structure having first and second end portions, the high fidelity structure being removably mounted on the first end portion of the elongated structure;
    an inertial structure mounted on the elongated structure and spaced from the high fidelity structure, the inertial structure, the high fidelity structure, and the elongated structure comprising a floating structure having a center of mass coincident with a portion of the elongated structure spaced between the high fidelity structure and the inertial structure; and
    a support structure having gimbolled bearing means connected to the elongated structure at a location adjacent to the center of mass of the floating structure.

2. The apparatus of claim 1, wherein the inertial structure comprises means for adjusting the moments of inertia of the floating structure.

3. The apparatus of claim 1, the gimbolled bearing means comprising means for permitting spinning rotation of the floating structure upon the longitudinal axis of the elongated structure.

4. The apparatus of claim 3, the support structure comprising means for permitting translation of the floating structure in any direction within a substantially horizontal plane.

5. The apparatus of claim 4, further comprising means for permitting vertical translational movement of the floating structure.

6. The apparatus of claim 5, the means for permitting vertical movement of the floating structure comprising a counterbalanced hoist mechanism connected to the gimbolled bearing means and mounted on the support structure, for permitting vertical translational movement of the floating structure relative to the support structure.

7. The apparatus of claim 6, further comprising servo-controlled actuator means drivingly connected to the hoist mechanism for substantially overcoming any frictional resistance within the counterbalanced hoist mechanism to vertical movement of the floating structure.

8. Apparatus for simulating a spinning, orbital satellite, having a first end portion which is desired to be replicated, in an environment subject to gravitational forces, the apparatus comprising:
    a high fidelity structure which substantially replicates the first end portion of the satellite;
    an inertial structure spaced from the high fidelity structure;
    an elongated, axial structure having first and second end portions, interconnecting the high fidelity structure and the inertial structure, the high fidelity structure being removably mounted on the elongated structure adjacent the structure first end portion, the high fidelity structure, the inertial structure, and the elongated structure comprising a floating structure having a mass which is substantially equal to that of the satellite and having a center of mass coincident with a portion of the elongated structure spaced between the high fidelity structure and the inertial structure; and
    a support structure having gimbolled bearing means, connected to the elongated structure at a location adjacent to the center of mass of the floating structure, permitting yaw and pitch of the floating structure relative to the support structure, the support structure and floating structure being translatable in any direction within a substantially horizontal plane;
    means for spinning the floating structure about the longitudinal axis of the elongated structure at a rotational velocity substantially equal to that of the satellite; and
    means, connecting the gimbolled bearing means to the support structure, for permitting vertical movement of the gimbolled bearing means and the floating structure relative to the support structure.

9. The apparatus of claim 8, the means connecting the gimbolled bearing means to the support structure comprising counterbalanced hoisting means for permitting vertical floating movement of the floating structure.

10. The apparatus of claim 9, the counterbalanced hoisting means having a servocontrolled actuating means for overcoming frictional but not inertial resistance to such forces.

11. A method of simulating a spinning, orbital satellite having a first end portion which is desired to be replicated, comprising:
providing a floating structure having an axial shaft, a high fidelity structure mounted on the shaft having an end portion substantially replicating the first end portion of the satellite, and an inertial structure mounted on the shaft at a location spaced from the high fidelity structure;
providing pivotal, rotatable, and translatable support to the floating structure at a location on the shaft substantially coincident with the center of mass of the floating structure; imparting a spinning motion to the floating structure such that said spinning motion of said satellite is simulated.

12. The method of claim 11, wherein the step of pivotally, rotatably, and translatably supporting the floating structure comprises supporting the floating structure to permit vertical floating movement in either vertical direction, and further comprises supporting the floating structure to permit pivotal movement thereof about yaw and pitch axes.

13. The method of claim 11, further comprising the step of rotating the floating structure about the longitudinal axis of the elongated structure at a rotational velocity substantially equal to that of the orbital satellite.

14. The method of claim 11 wherein at least one additional orbital satellite is desired to be simulated, further comprising the step of removing the high fidelity structure from the elongated structure and replacing it with another high fidelity structure which substantially replicates the configuration of the at least one additional orbital satellite.

15. The method of claim 11, further comprising the step of adjusting the mass and moments of inertia of the floating structure to substantially duplicate those of the orbital satellite.

16. The method of claim 15, wherein the inertial structure comprises an annular structure having a plurality of weights and having adjustable support means for supporting the weights at respective locations positioned at respectively adjustable radial distances from the rotational axis, and whereby the adjustment of moments of inertia of the floating structure is accomplished by adjusting the radial distances of the respective weights from the rotational axis.

* * * * *